US007248964B2

(12) United States Patent
Bye

(10) Patent No.: US 7,248,964 B2
(45) Date of Patent: Jul. 24, 2007

(54) SYSTEM AND METHOD FOR USING MULTIPLE AIDING SENSORS IN A DEEPLY INTEGRATED NAVIGATION SYSTEM

(75) Inventor: Charles T. Bye, Eden Prarie, MN (US)

(73) Assignee: Honeywell International Inc., Morristown, NJ (US)

( * ) Notice: Subject to any disclaimer, the term of this patent is extended or adjusted under 35 U.S.C. 154(b) by 677 days.

(21) Appl. No.: 10/729,298

(22) Filed: Dec. 5, 2003

(65) Prior Publication Data

US 2005/0125141 A1    Jun. 9, 2005

(51) Int. Cl.
G01C 21/16    (2006.01)
G01S 5/14    (2006.01)

(52) U.S. Cl. .................. 701/200; 701/213; 701/216; 701/220; 342/357.14

(58) Field of Classification Search ............. 701/200, 701/213, 214, 216, 220, 4, 14; 342/357.02, 342/357.06, 357.11, 357.14, 357.15
See application file for complete search history.

(56) References Cited

U.S. PATENT DOCUMENTS

| | | | |
|---|---|---|---|
| 5,343,209 A | 8/1994 | Sennott et al. ............ 342/357 |
| 5,398,034 A | 3/1995 | Spilker, Jr. ............... 342/357 |
| 5,917,445 A | 6/1999 | Schipper et al. .......... 342/357 |
| 5,983,160 A | 11/1999 | Horslund et al. ......... 701/213 |
| 6,088,653 A | 7/2000 | Sheikh et al. ............. 701/214 |
| 6,114,988 A | 9/2000 | Schipper et al. .......... 342/357 |
| 6,127,970 A | 10/2000 | Lin ...................... 342/357.14 |
| 6,157,891 A | 12/2000 | Lin ........................... 701/301 |
| 6,167,347 A | 12/2000 | Lin ........................... 701/214 |
| 6,205,400 B1 | 3/2001 | Lin ........................... 701/214 |
| 6,234,799 B1 | 5/2001 | Lin ............................ 434/40 |
| 6,240,367 B1 * | 5/2001 | Lin ........................... 701/214 |
| 6,246,960 B1 | 6/2001 | Lin ........................... 701/214 |
| 6,278,945 B1 | 8/2001 | Lin ........................... 701/216 |
| 6,292,750 B1 | 9/2001 | Lin ........................... 701/214 |
| 6,298,318 B1 | 10/2001 | Lin ............................. 703/23 |

(Continued)

FOREIGN PATENT DOCUMENTS

WO    WO 01/94971    12/2001

OTHER PUBLICATIONS

International Search Report PCT/US2004/039844.

(Continued)

*Primary Examiner*—Tan Q. Nguyen
(74) *Attorney, Agent, or Firm*—McDonnell Boehnen Hulbert & Berghoff LLP

(57) ABSTRACT

A navigation system with resume logic and mode logic provides as an output an accurate navigation solution using multiple RF sensors. The resume logic determines which sensors are currently providing good data to the navigation system. The mode logic selects an operating mode of the navigation system and selects which data to use for calculating corrections to the navigation solution. The mode logic makes the selections based on the results of the resume logic. The resume logic continues to test data from the sensors. If a sensor that has previously provided erroneous data starts providing good data, the mode logic will automatically select that data for use in calculating the corrections to the navigation solution. The tracking of RF transmitters by the multiple RF sensors is controlled using a plurality of available inertial and non-inertial sensors.

38 Claims, 6 Drawing Sheets

U.S. PATENT DOCUMENTS

| | | | | |
|---|---|---|---|---|
| 6,311,129 | B1* | 10/2001 | Lin | 701/214 |
| 6,408,245 | B1* | 6/2002 | An et al. | 701/216 |
| 6,415,223 | B1 | 7/2002 | Lin et al. | 701/208 |
| 6,812,887 | B2* | 11/2004 | Syrjarinne et al. | 342/357.12 |
| 6,826,478 | B2* | 11/2004 | Riewe et al. | 701/220 |
| 6,900,760 | B2* | 5/2005 | Groves | 342/357.14 |
| 2001/0020216 | A1 | 9/2001 | Lin | 701/216 |
| 2002/0008661 | A1 | 1/2002 | McCall et al. | 342/357.14 |
| 2002/0047799 | A1 | 4/2002 | Gustafson et al. | 342/357.12 |
| 2002/0116126 | A1 | 8/2002 | Lin | 701/214 |

OTHER PUBLICATIONS

Bedell, F. Cole, "Choosing an Integrated GPS/INS System Loosely, Closely or Tightly?," Sensor and Guidance Products, GNO, Honeywell Inc.

Dowdle, John R. and Karl W. Fluecking, "A GPS/INS Guidance System for Navy 5" Projectiles" Based On A Paper Presented At the Institute of Navigation's 52$^{nd}$ Annual Meeting, Cambridge, MA, 19-211, Jun. 1996.

Gustafson, Donald E., John R. Dowdle and Karl W. Flueckiger, "A High Antijam GPS-Based Navigator," I0N Reprinted, with permission, from the Institute of Navigation Technical Meeting held in Anaheim, CA Jan. 26-28, 2000.

Ohlmeyer, Ernest J., Thomas R. Peptine, and B. Larry Miller, "Assessment of Integrated GPS/INS for the Ext171 Extended Range Guided Munition,".

Ohlmeyer, Ernest J., et al., "GPS-Aided Navigation System Requirements for Smart Munitions and Guided Missle,".

Soehren, Wayne and Charles Keyes, "Human-Motion Based-Navigation Algorithm Development,".

* cited by examiner

| Aiding Source | Navigation Output | | Engage Leveling* |
| --- | --- | --- | --- |
| | Position/Velocity** | Attitude | |
| GPS PVT | Yes | Yes | No |
| GPS PR/DR | Yes | Yes | No |
| GPS Heading | No | Yes | Yes |
| Magnetometer | No | Yes | Yes |
| Air Data | No | Yes | Yes |
| Velocity | Yes | Yes | No |
| Odometer | Yes | Yes | No |
| Attitude | No | Yes | Yes |
| Change in Attitude | No | Yes | Yes |
| Deep Integration | Yes | Yes | No |

| Notes: | |
| --- | --- |
| * | Leveling is engaged only if all engaged aiding sources do not compute Postion and Velocity and if the quality of the inertial sensors are not sufficient to compute position and velocity to the level required by the application's attitude requirements. Leveling may not be engaged immediately when the aid becomes unavailable based on time or the Kalman Filter covariances. |
| ** | If any aiding source with "yes" is enabled (e.g. GPS PVT) then Postion and Velocity output are available |

Fig. 2

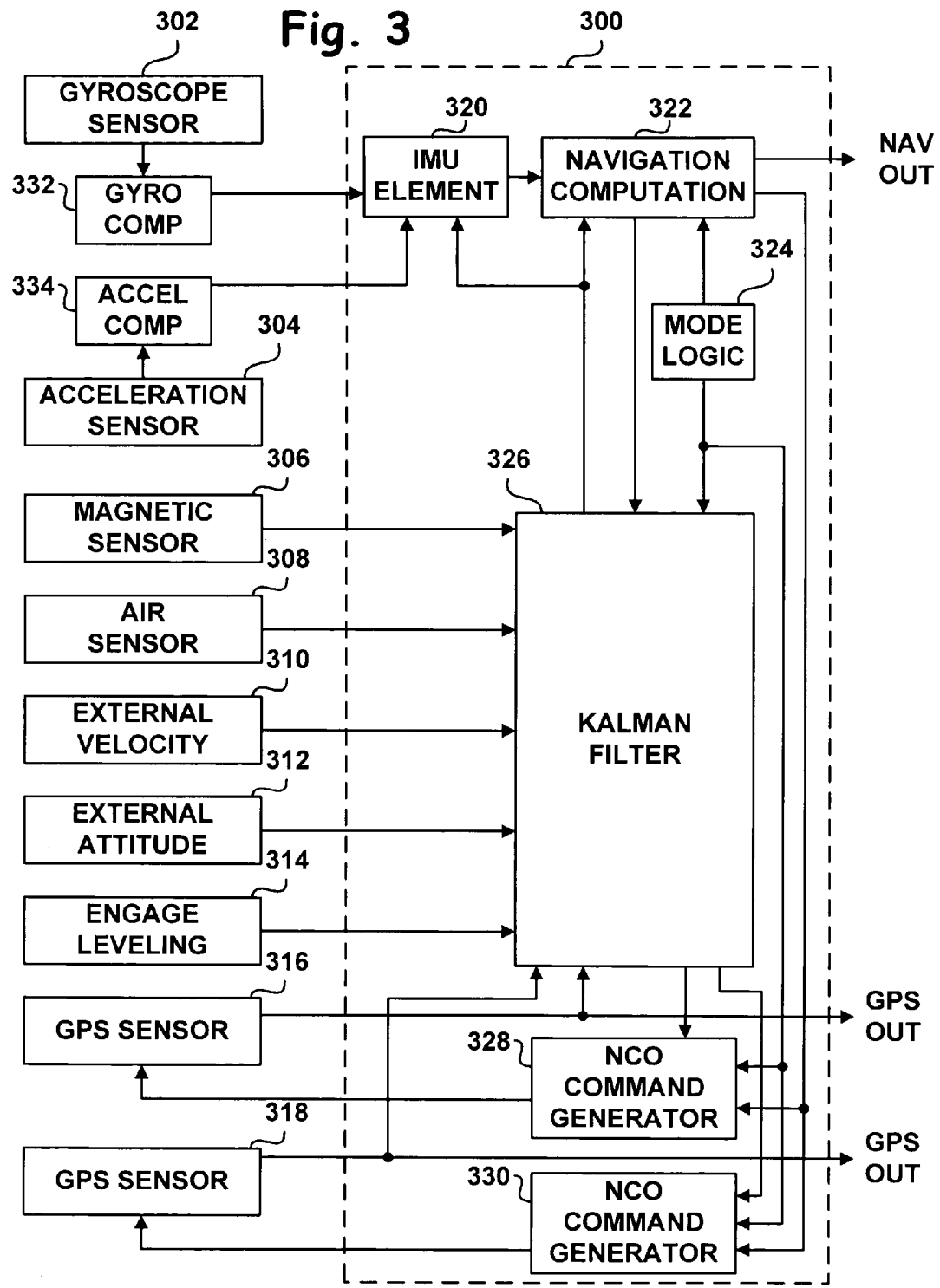

SYSTEM AND METHOD FOR USING MULTIPLE AIDING SENSORS IN A DEEPLY INTEGRATED NAVIGATION SYSTEM

FIELD

The present invention relates generally to avionic systems, and more particularly, using multiple aiding sensors in a deeply integrated navigation system. The present invention, in addition to being applied to airborne applications, can be applied to land and underwater applications.

BACKGROUND

A pilot receives information from many sources during take-off, flight, and landing of an aircraft. The aircraft includes avionic systems designed to collect data, perform calculations on the data, and present the data to the pilot. For example, the aircraft may include an inertial navigation system (INS), an Attitude Heading Reference System (AHRS), an air data computer, a roll-pitch-yaw computer, a mission computer, various displays, and other avionic systems. Some avionic systems may include one or more sensors that collect data, such as attitude, heading, altitude, and air speed. The same or other avionic systems may process this data. Avionic displays may present the data to the pilot in a usable format.

If one of the sensors becomes inoperable, the pilot may have to rely on the information he can obtain from other sensors to continue the flight and land the aircraft safely. For example, the INS and the AHRS systems may provide similar information to the pilot. Both systems may provide attitude and heading information to the pilot. If there was a problem with the INS, the pilot may obtain some of the same information from the AHRS. Additionally, it is important that the data that the pilot is receiving is accurate. So if the INS is providing data, but the data is erroneous, the pilot should use the data obtained from the AHRS and ignore the INS data.

Typically, when one of the sensors fails or provides erroneous data, the sensor and/or the associated avionic system is deactivated. For example, if the INS fails, the INS would be deactivated and the pilot would rely on data obtained from the AHRS. The pilot would not be able to use data from the INS again unless the pilot manually re-started the INS. Additionally, the pilot has no way of knowing if the INS has resumed providing reliable data until after re-starting the INS. Accordingly, a pilot will typically land the aircraft using the AHRS data and trouble shoot the INS once the aircraft is grounded.

While the previous example is presented using the INS and the AHRS, other avionic systems and/or sensors may provide an overlap of information such that if one fails, the pilot still has access to some data. This redundancy of information provides for safer flights.

Additionally, the redundancy of information may improve the accuracy of some avionic systems. For example, the aircraft may include both an INS and a global positioning satellite (GPS) receiver, or other radio frequency (RF) ranging system, such as Time Difference of Arrival (TDOA) and Galileo. Both the INS and the GPS receiver may provide estimates of the aircraft's position. In addition, the data from the GPS receiver may be used to calibrate the INS, while the GPS receiver may use the data from the INS to quickly re-establish tracking of a satellite in which the GPS receiver has temporarily lost contact. Thus, the integration of the INS and GPS receiver provides more accurate and robust data to the pilot.

The integration of the INS and the GPS receiver may be described as loosely, closely, tightly, or deeply coupled. A loosely coupled system may be described as a stand-alone GPS receiver integrated with a stand-alone INS. The GPS receiver passes position, velocity, and time (PVT) information obtained from four satellites to the INS. The INS uses the PVT information to correct inertial errors that are commonly associated with INS operation. However, the GPS data passed to the INS becomes unusable when less than four satellites are available to the GPS receiver.

A closely coupled system may be described as a stand-alone GPS receiver integrated with a stand-alone INS. However in a closely coupled system, in addition to the GPS receiver passing PVT information obtained from typically four satellites to the INS, the INS passes velocity, acceleration, and angular rate information to the GPS receiver. The GPS receiver can use this information when tracking satellites and to re-acquire a satellite signal that has been lost. However, as with the loosely coupled system, the GPS data passed to the INS becomes less usable when less than four satellites are available to the GPS receiver. For example, when only three satellites are available, GPS receivers typically continue to output horizontal position, but do not output valid altitude data.

In a tightly coupled system, the GPS receiver provides pseudorange and/or deltarange data to the INS. The GPS receiver contains tracking loops for tracking data from multiple satellites. The tracking loops provide pseudorange and deltarange measurements to the INS. The pseudorange measurements are an output of a delay lock loop, which is used for tracking code phase, while the deltarange measurements are an output of a phase lock loop, which is used for tracking carrier phase. The pseudorange and deltarange measurements are used by a Kalman filter in the INS to calculate errors, which sends correction data to a navigation computation.

In the tightly coupled system, the GPS receiver sends pseudorange and deltarange to the INS for all satellites that are being tracked. The INS may continue to use the data obtained from the GPS receiver even when fewer than four satellite signals are being tracked. The INS in a tightly coupled GPS/INS system can continue to use the GPS data with less than four available satellites because each pseudorange and deltarange measurement is an independent measurement.

A deeply coupled system includes a GPS function and an Inertial Measurement Unit (IMU). The GPS function may be defined as the processing associated with computing the GPS data, while the IMU is generally described as the inertial sensing component of the INS, providing data directly to a computer. In a deeply coupled system, a stand-alone GPS receiver may not exist. For example, the functions of the GPS receiver may be resident in a single processor, along with the INS function.

The computer performs the INS computations. However, in contrast with the tightly coupled system which uses pseudorange and deltarange data, measurements from all available satellites are processed by the Kalman filter using in-phase (I) and quadrature (Q) signals, which are calculated in the GPS function. The Kalman filter calculates the errors and sends correction data to the navigation computation and to the GPS function. The information sent to the GPS function includes commands to replica code generators to enable the GPS function to track the GPS satellites. This capability eliminates the need for standalone tracking loops in the GPS function. By combining information from multiple satellites and the inertial sensors, the deeply coupled system is able to track the satellites under higher interference or jamming levels.

Accordingly, the more integrated the GPS/INS system becomes, the more robust the navigation system becomes. Additional benefits may be obtained by integrating data from other sensors. For example, data from the deeply integrated GPS/INS system may be used to calibrate the air data computer and a magnetometer. The air data computer and magnetometer may then be used as aids should GPS data become unavailable and the performance of the INS has degraded to a level where air data or magnetometer aiding will improve the accuracy of the navigation solution.

It would be beneficial to use a deeply integrated GPS/INS system in a navigation system that is operable to automatically resume using data from a sensor that resumes providing reliable data. Accordingly, the pilot may operate the aircraft using the best data available from the avionic sensors.

BRIEF DESCRIPTION OF THE DRAWINGS

Presently preferred embodiments are described below in conjunction with the appended drawing figures, wherein like reference numerals refer to like elements in the various figures, and wherein:

FIG. 2 is a table summarizing available outputs in the navigation solution depending on the aiding sources available, according to an exemplary embodiment, FIG. 3 is a block diagram of a system processor, according to an exemplary embodiment;

DETAILED DESCRIPTION

Figure 1:
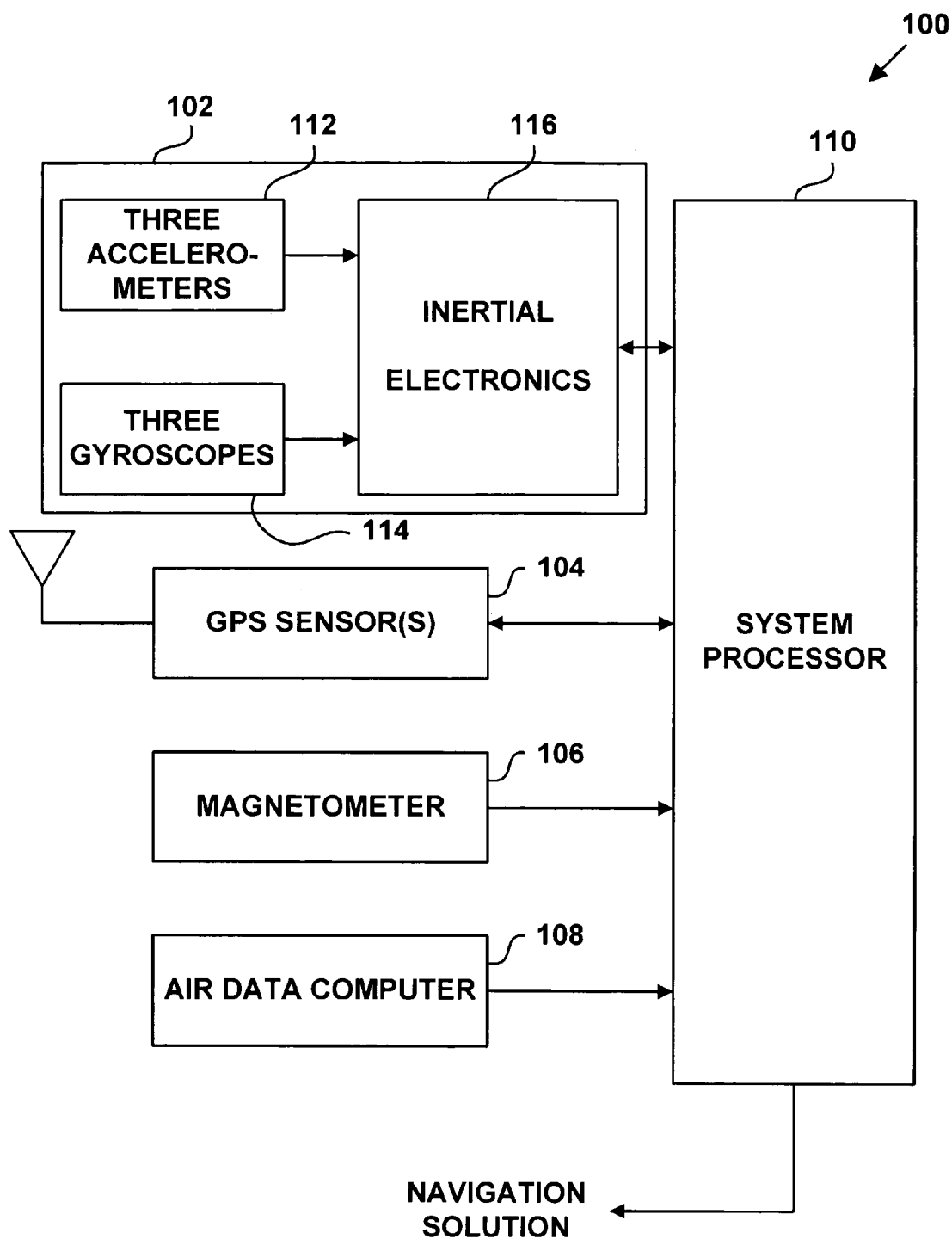
FIG. 1 is a block diagram of a deeply integrated navigation system, according to an exemplary embodiment.

FIG. 1 is a block diagram of a deeply integrated navigation system 100, according to an exemplary embodiment. The navigation system 100 includes an Inertial Measurement Unit (IMU) 102, one or more GPS sensors 104, a magnetometer 106, an air data computer 108, and a system processor 110. The navigation system 100 may also include additional entities not shown in FIG. 1. In a preferred embodiment, the navigation system 100 may be provided in a single package.

The IMU 102 may provide acceleration and angular rate data. Typically the IMU 102 relies on three orthogonally mounted acceleration sensors and three nominally orthogonally mounted inertial angular rate sensors, which can provide three-axis acceleration and angular rate measurement signals. Accordingly, the IMU 102 may include three accelerometers 112 and three gyroscopes 114. The three accelerometers 112 may be any type of accelerometer, such as a force re-balance, resonating beam, or MEMS accelerometer. The three gyroscopes 114 may be any type of gyroscope, such as a ring laser or MEMS gyroscope. The three accelerometers 112 and three gyroscopes 114 may be packaged together with a processor and associated navigation software. Alternatively, self-contained IMU packages may also be used.

Additionally, the IMU 102 may include inertial electronics 116. The inertial electronics 116 may be used to convert the acceleration and angular rate data obtained by the IMU 102 into a digital representation of the data. The inertial electronics 116 may also provide compensation of the acceleration and angular rate data. This compensation may include compensation in which compensation coefficients or other characteristics of the compensation are updated by the system processor 110. The combination of the IMU 102 and the system processor 110 may be referred to as an INS.

The one or more GPS sensors 104 may be a GPS receiver, TDOA, Galileo, or any other RF ranging system. It is understood that the term GPS sensor as used in this specification includes any RF ranging system. The GPS sensor 104 may provide three-dimensional PVT information. Additionally, the GPS sensor 104 may provide pseudorange and deltarange (PR/DR) information and/or in-phase and quadrature (I & Q) information. If multiple GPS sensors 104 are used with separate and suitably located antennas, then an estimate of heading may be computed using the information from the GPS sensor 104. Typically, the GPS sensor 104 is used in conjunction with the INS to provide a more robust navigation solution. The INS, alone or in conjunction with other aids, may provide data to the aircraft when a satellite signal is temporarily lost due to interference. The GPS sensor 104 may use the INS data to quickly regain a lost satellite signal. Additionally, the INS may use GPS data for initialization, calibration, and/or aiding.

The magnetometer 106 may detect the Earth's magnetic field. Data from the magnetometer 106 may be used to determine the heading of the aircraft. This information may be used to initialize the system or as an aid to the INS. The system processor 110 may use the heading information from the magnetometer 106 in combination with GPS PVT information, GPS PR/DR information, GPS I & Q information, GPS-derived heading information, or inertial-derived heading information to provide an improved heading reading to the pilot. The INS, in conjunction with other aiding sensors, may also be used to calibrate the magnetometer 106.

The air data computer 108 may be used to calculate altitude, vertical speed, air speed, and a mach number of the aircraft. Other calculations may also be possible, such as air temperature. Pressure transducers within the air data computer 108 may be used to collect data. The system processor 110 may be used to convert the data collected by the pressure transducers and provide altitude, vertical speed, air speed, and mach number outputs. The INS may use outputs from the air data computer 108 for calculating altitude, as an aiding sensor to improve the overall navigation solution, for use in reversionary modes, and during initialization. The INS, in conjunction with other aiding sensors, may also be used to calibrate the air data computer 108.

If sufficient aiding information is not available and the inertial sensors do not accurately compute position and velocity sufficient to maintain an application's attitude requirements, then the navigation system 100 may limit its computations to data typically computed by an AHRS function. The AHRS function is typically defined as an inertial system that outputs only attitude, which includes pitch, roll, and heading. An AHRS function typically does not output position and velocity data. Additionally, errors in pitch, roll, and heading for the AHRS function are typically bounded by one or more aiding sources or the accelerometers 112 through the use of a slaving of the attitude to a gravity vector. The aiding sources or accelerometers 112 may be used in a slaving loop to improve the estimate of attitude. In this approach, the navigation system 100 may use a Kalman filter to correct the attitude based on the gravity vector. Thus, the AHRS function is not depicted in FIG. 1, because it does not exist as a separate function.

The system processor 110 may receive data from the sensors, provide error correction, and provide as an output the navigation solution. The system processor 110 may include any combination of hardware, firmware, and/or software operable to receive the data, process the data, and calculate a navigation solution. The navigation solution may be a three-dimensional position, three-dimensional velocity, and three-dimensional attitude solution. Other avionics systems may use the navigation solution. For example, the aircraft's position may be displayed for the pilot on a head-up display.

When in the navigation mode (e.g., when navigation is engaged), the type and quality of the navigation outputs may depend on the type and quality of data received by the system processor 110. The type and quality of the navigation outputs may also depend on the performance of the inertial sensors. For example, the quality of the data may be better when the system is being aided by deep integration than when the system has only the heading aid enabled. For example, the navigation solution may include position, velocity, and attitude data if the aircraft is being aided by GPS PVT. As another example, the navigation solution may include just the attitude data if the aircraft is being aided by the magnetometer with leveling engaged. Additionally, the navigation system 100 may be in standby mode, in which case no navigation solution may be provided. Other modes may be possible, such as a test mode.

The engage leveling capability is typically accomplished through one of two methods, the traditional method and the Kalman filter method. Traditionally, the leveling capability has been accomplished through conventional filtering techniques that simply slave an attitude matrix to level based on the assumption that the gravity vector is vertical. However, this can cause problems during coordinated turns in which the acceleration vector is not vertical. During these periods, the leveling loop may be temporarily disengaged. The fact that the aircraft may be in a coordinated turn may be based on the attitude of the aircraft. For example, the leveling loop may be disengaged when the roll angle is greater than five degrees.

Another method of implementing the leveling capability is to perform the leveling through the Kalman filter located within the system processor 110. The Kalman filter method may overcome or reduce the problem associated with the assumption that the gravity vector is vertical. The Kalman filter may contain additional states to model the leveling capability. The Kalman filter may use a comparison of a predicted and an actual acceleration component to calculate an attitude error. The attitude error may be used to perform the leveling.

FIG. 2 is a table that summarizes the available outputs in the navigation solution depending on the aiding sources available. Attitude data is generally always available. However, position and velocity data availability may be dependant upon the type of aiding sources that are available and the performance of the inertial sensors. Leveling may be engaged when performance of the inertial sensors is not sufficient to meet the application's attitude requirements and an aiding source that does not compute position and velocity is enabled. The navigation system 100 may output position, velocity, and attitude for a period of time, and then may switch to attitude-only outputs based on the time or covariance values on the Kalman filter.

FIG. 3 is a block diagram of a system processor 300, according to an exemplary embodiment. The system processor 300 may be substantially the same as the system processor 110 depicted in FIG. 1. The system processor 300 may include an IMU compensation element 320, a navigation computation element 322, mode logic 324, a Kalman filter 326, and two numerical controlled oscillator (NCO) command generators 328, 330.

The number of NCO command generators in the system processor 300 may be determined by the number of GPS, Galileo, or other RF ranging sensors providing data to the Kalman filter 326. Accordingly, more or less than two NCO command generators may be located in the system processor 300. Alternatively, the NCO command generators 328, 330 may be located outside the system processor 300. The system processor 300 may include additional elements not depicted in FIG. 3 as well. In an alternative embodiment, the IMU compensation element 320 may be partially or completely located in the IMU 102.

The system processor 300 may receive a variety of data from a variety of sources. The system processor 300 may receive the following types of data: compensated or uncompensated gyroscope data, compensated or uncompensated acceleration data, magnetic data, air data, external velocity data 310, external attitude data 312, and GPS data, otherwise referred to as sensor data.

The external velocity data 310 and the external attitude data 312 may be provided by other inertial navigation systems on the aircraft, such as an aircraft INS. The external velocity data 310 may indicate the velocity of the aircraft, including when the velocity of the aircraft is zero (i.e., stationary). Further, the external velocity data 310 may be calculated as a conventional velocity measurement or as a conventional change in position over a specified time period (e.g., the Kalman filter interval).

The system processor 300 may receive sensor data from the following sensors: gyroscope sensors 302, acceleration sensors 304, magnetic sensors 306, air sensors 308, and two GPS sensors 316, 318. While two GPS sensors are depicted in FIG. 3 more or less than two GPS sensors may provide GPS data to the system processor 300. The system processor 300 may receive additional data as well, such as data from an odometer. Additionally, the system processor may receive an indication of whether or not to engage leveling 314. The indication of whether or not to engage level 314 may be based on time since an aid became unavailable or on the Kalman filter 326 covariances.

The sensors 302-308, 316, and 318 may sense the state of the vehicle. Gyroscope electronics 332 may convert data from the gyroscope sensors 302 into a digital representation of the gyroscope data prior to sending the gyroscope data to the system processor 300. Likewise, accelerometer electronics 334 may convert data from the acceleration sensors 304 into a digital representation of the acceleration data prior to sending the acceleration data to the system processor 300.

The format and accuracy of data from the two GPS sensors 316, 318 may depend on whether the navigation system 100 is in a deeply integrated mode or a PVT/PR-DR aiding mode. Further, if the navigation system 100 is in the PVT/PR-DR aiding mode, the format and accuracy of the GPS sensor data may depend on whether the two GPS sensors 316, 318 are in a PVT mode or a PR/DR mode. The GPS sensor data is further described with reference to FIG.

4. Galileo or other RF ranging sensors may be used instead of or in conjunction with the GPS sensors 316, 318.

The system processor 300 may provide as an output a navigation solution. The navigation solution may be a three-dimensional position, three-dimensional velocity, and three-dimensional attitude solution. However, the exact navigation solution may depend on the operational mode of the aircraft. Additionally, the system processor 300 may provide GPS outputs. The GPS outputs may be the data obtained from the two GPS sensors 316, 318, with or without additional processing from the system processor 300. Additional outputs are also possible. Other avionics systems may use the navigation solution and the GPS outputs. For example, the aircraft's position may be displayed for the pilot on a head-up display.

The IMU element 320 may receive the data from the gyroscope electronics 332 and the acceleration electronics 334. The combination of the gyroscope electronics 332 and the acceleration electronics 334 may be substantially the same as the inertial electronics 116 as depicted in FIG. 1. The IMU element 320 may provide compensation that uses information from multiple sensors (e.g., three accelerometers and three gyroscopes) to compensate one or more of the inertial sensors. For example, the IMU element 320 may compensate for coning, sculling, and/or gravitational effects.

Additionally, the Kalman filter 326 may provide estimates of gyroscope and accelerometer errors to the IMU element 320 and/or to the navigation solution. Inertial navigation systems experience drifts over time, which causes errors in the position, velocity, and attitude solutions. The errors may be caused by gyroscope drift, accelerometer bias, scale factor errors, and other error sources. The navigation corrections provided by the Kalman filter 326 may correct the errors in the navigation solution caused by these errors. The IMU element 320 may provide compensated IMU data to the navigation computation element 322.

The navigation computation element 322 may be software capable of blending the IMU data received from the IMU element 320 and the navigation corrections provided by the Kalman filter 326 to produce a navigation solution. The navigation computation element 322 may calculate the navigation solution by numerically solving Newton's equations of motion using the data received from the IMU element 320 and the Kalman filter 326. The navigation solution may be referenced to a navigation coordinate frame. Possible navigation coordinate frames include earth centered inertial (ECI), earth centered earth fixed (ECEF), local level with axes in the directions of north, east, down (NED), and local level with a wander azimuth.

Additionally, the navigation computation element 322 may provide the navigation solution to the Kalman filter 326. The Kalman filter 326 may use the navigation solution to calculate estimates of future calculated navigation solutions. In this manner, the Kalman filter 326 may provide a recursive method of calculating the errors in the sensors used to compute the navigation solution.

The navigation computation element 322 may also receive an input from the mode logic 324. The mode logic 324 may indicate whether or not the navigation computation element 322 should provide a navigation solution. When the mode logic 324 indicates that the navigation computation element 322 should not provide a navigation solution, the navigation system 100 may be in standby mode. Alternatively, when the mode logic 324 indicates that the navigation computation element 322 should provide a navigation solution, the navigation system 100 may be in navigation mode.

The mode logic 324 may be any combination of hardware, firmware, and/or software that is operable to determine whether a navigation solution should be provided, and if so, what type of navigational solution should be provided. For example, the aircraft may be in stand-by mode and not require a navigation solution. However, if the aircraft is in navigation mode, the mode logic 324 may determine whether the navigation solution should be based on the deeply integrated mode or the aiding mode. Further, if the aircraft is in the aiding mode, the mode logic may determine whether to use the PVT mode or the PR/DR mode. Additional information regarding the mode logic 324 is described with reference to FIG. 5.

The Kalman filter 326 may be any combination of hardware, firmware, and/or software operable to provide an estimate. Kalman filters are well known in the art for use in providing correction data to a navigation computation element to provide a more accurate navigation solution. The Kalman filter 326 may receive data from the sensors and estimate navigation corrections of the aircraft's position, velocity, and/or attitude. The Kalman filter 326 may estimate navigation corrections using a model of the INS error dynamics. The Kalman filter 326 may provide the estimate to the IMU element 320, the navigation computation element 322, and the NCO command generators 328, 330.

The NCO command generators 328, 330 may receive parameter estimates from the Kalman filter 326 and the navigation solution from the navigation computation element 322 when the navigation system 100 is in the deep integration mode. The NCO command generators 328, 330 might not be used when the navigation system 100 is in the aiding mode. The NCO command generators 328, 330 may generate code and carrier command signals. The code and carrier command signals may be used in calculating the GPS sensor data in the deep integration mode. The function of the NCO command generators 328, 330 is further described with reference to FIG. 4B.

Figure 4A:
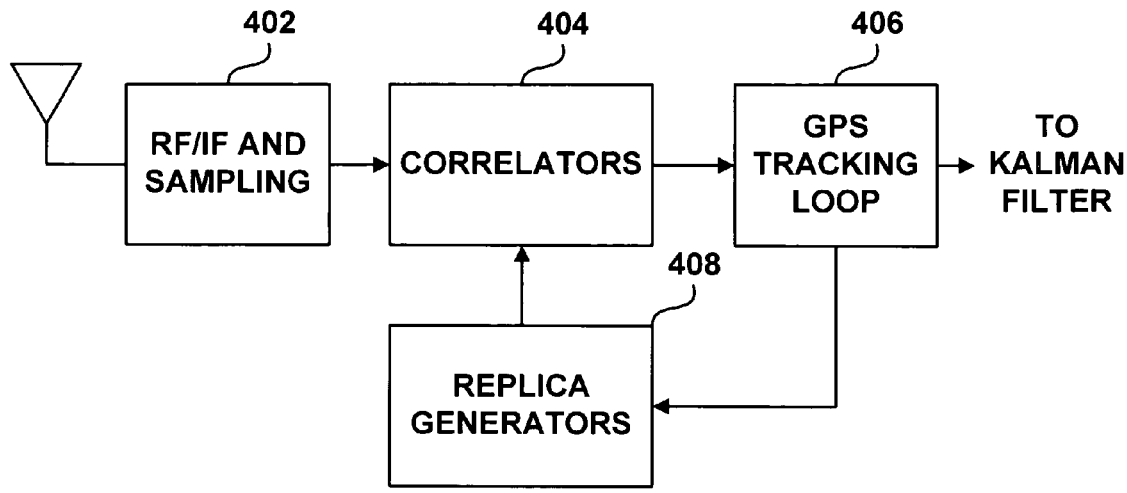
FIG. 4A is a block diagram of a method of calculating GPS sensor data in an aiding mode, according to an exemplary embodiment.
Figure 4B:
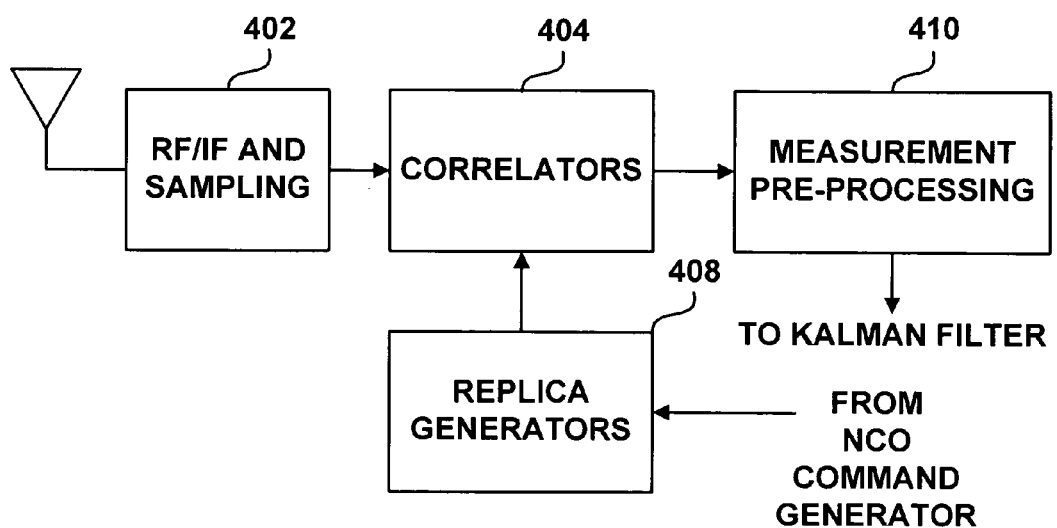
FIG. 4B is a block diagram of a method of calculating GPS sensor data in a deep integration mode, according to an exemplary embodiment.

FIG. 4 is a block diagram of a method of calculating the GPS sensor data. FIG. 4A is a block diagram of a method of calculating the GPS sensor data in the aiding mode, while FIG. 4B is a block diagram of a method of calculating the GPS sensor data in the deep integration mode. In both the aiding mode and the deep integration mode, the GPS sensor 104 detects and receives data from orbiting satellites. The orbiting satellites broadcast a continuous series of radio signals, referred to as GPS signals, which are detected by the GPS sensor 104. The radio signals contain information regarding the known position of the satellites. Based on the reception of the radio signals, the GPS sensor 104 is able to estimate the distance to each satellite, and the relative velocity of the satellites with respect to the GPS sensor 104.

The satellites currently broadcast on two frequencies. The two frequencies are referred to as L1 (1575.42 MHz) and L2 (1227.6 MHz). During the propagation of the GPS signals through the atmosphere, a loss in signal strength occurs. Accordingly, the GPS signals may be processed into usable signals. In the future, additional frequencies may be added to GPS satellites, or satellites using a different signal structure, such as Galileo, may become available. The techniques described herein may be used with Galileo, RF ranging systems, and these new frequencies and signal structures.

The GPS signals received by the GPS sensor 104 may be processed by the RF/IF and sampling element 402. The RF/IF and sampling element 402 may be located in the GPS sensor 104. The GPS signal may pass through a high-pass filter that rejects all parts of the signal that are not within the L1 or L2 bandwidths, producing a radio frequency (RF)

signal. The RF signal may be down converted to an intermediate frequency (IF). The IF signal may be sampled to convert the IF signal into a digital form. The digital form of the IF signal may be provided to a bank of correlators 404 or for use in a software defined GPS radio. A software defined GPS radio may process data at frequencies below IF, at IF, or higher than IF, including at the original RF signal frequency.

The bank of correlators 404 may be used to determine if a bank of replica generators 408 is generating a replica that is identical in structure, time, and frequency to the received GPS satellite signal. The result of this correlation may be a set of signals that includes an in-phase signal and a signal that is 90 degrees out of phase from a reference signal located within the GPS sensor 104. The bank of correlators 404 and the bank of replica generators 408 may be located within the GPS sensor 104.

The number of satellites being tracked may determine the number of correlators in the bank of correlators 404. A bank of correlators 404 may include three correlators for each satellite tracked to detect early, prompt, and late GPS signal transmissions. The bank of correlators 404 may provide outputs $I_E$, $I_P$, $I_L$ (e.g., early, prompt, and late in-phase signals) and $Q_E$, $Q_P$, $Q_L$ (e.g., early, prompt, and late quadrature signals) for each satellite tracked. The I & Q data is often summed prior to use by other functions. Typically the data is summed for 20 msec, thus generating data samples at a 50 Hz rate. Of course, other data rates may be used.

As depicted in FIG. 4A, the bank of correlators 404 may provide the I and Q components of the GPS signal to a GPS tracking loop 406 in the aiding mode. The GPS tracking loop 406 may be located within the GPS sensor 104 or the system processor 110. The GPS tracking loop 406 may include both a carrier tracking loop and a code tracking loop. The tracking loops provide pseudorange and deltarange measurement outputs. The pseudorange measurements are an output of a delay lock loop, which is used for tracking code phase, while the deltarange measurements are an output of a phase lock loop, which is used for tracking carrier phase. The pseudorange and deltarange measurements are used by the Kalman filter 326 to estimate navigation corrections when the navigation system 100 is in the aiding mode.

The pseudorange and deltarange measurements may also be provided to the bank of replica generators 408 in the aiding mode. The measurements are scaled and time-phased to adjust the replica generators 408 to enable the replica generator 408 to continue to generate a replica that is identical in data, time, and frequency to the GPS signal received from the satellite.

As depicted in FIG. 4B, the bank of correlators 404 may provide the I and Q components of the GPS signal to a measurement and pre-processing element 410, instead of the GPS tracking loop 406, in the deep integration mode. The measurement and pre-processing element 410 may be located within the system processor 110. The measurement and pre-processing element 410 may calculate a code error estimate ($\hat{E}_\tau$) and a carrier error estimate ($\hat{E}_\phi$) based on the early, prompt, and late I and Q components of the GPS signal, as provided by the bank of correlators 404. The code and carrier error estimates may be calculated as follows.

$$E = \sqrt{I_E^2 + Q_E^2} \quad \text{(Equation 1)}$$

-continued $$L = \sqrt{I_L^2 + Q_L^2} \quad \text{(Equation 2)}$$

$$\hat{E}_\tau = \frac{E - L}{2(E + L)} \quad \text{(Equation 3)}$$

$$\hat{E}_\phi = \tan^{-1}\left(\frac{Q_P}{I_P}\right) \quad \text{(Equation 4)}$$

The code and carrier error estimates may be converted from the 50 Hz data rate to a 10 Hz data rate prior to sending the error estimates to the Kalman filter 326. Other data rates may be used.

The Kalman filter 326 may receive the code and carrier error estimates from the measurement and pre-processing element 410 and estimate navigation corrections of the aircraft's position, velocity, and/or attitude, as well as the GPS clock, clock drift, and other parameters associated with the GPS clock. The Kalman filter 326 may include 43 state vector elements. The state vector elements may include navigation errors (e.g., position, velocity, and attitude), GPS oscillator errors, range bias states, and inertial sensor errors. More or less than 43 vector elements may be used. For example, not all range bias state vectors may be used or additional range bias states may be added to enable the simultaneous tracking of more or less GPS satellites.

The Kalman filter estimate of navigation corrections may be transmitted to the NCO command generators 328, 330 at a 10 Hz data rate. Other data rates may be used. The NCO command generators 328, 330 may also receive the navigation solution as provided by the navigation computation element 322. In a preferred embodiment, a 100 Hz data rate is used; however, other data rates may be used. The data received from the Kalman filter 326 and the navigation computation element 322 may be used to compute and estimate the satellite range over an interval. The interval is the period of time between when the NCO command generators 328, 330 are updated. In a preferred embodiment the update rate is 50 Hz, but other rates may be used.

For each satellite tracked, the satellite's pseudorange at a start time ($\hat{\rho}_{start}$) is computed. At the end of the interval, the satellite's pseudorange at a stop time ($\hat{\rho}_{stop}$) is computed. The data received from the Kalman filter 326 and the navigation computation element 322 may be used to compute the pseudorange at the start time and the stop time. The pseudorange calculation at the stop time may then become the pseudorange calculation at the start time for the next interval. For each satellite tracked, the NCO command generators 328, 330 may calculate a code command (Code_cmd) and a carrier command (Carrier_cmd) that may be used to update the NCO command generators 328, 330. The code and carrier commands may be calculated as follows.

$$\Delta\hat{\rho} = \hat{\rho}_{stop} - \hat{\rho}_{start} \quad \text{(Equation 5)}$$

$$\Delta\hat{\tau} = \Delta\hat{\rho}/\lambda_C; \lambda_C \approx 29.3 \text{ m} \quad \text{(Equation 6)}$$

$$\Delta\hat{\phi} = \Delta\hat{\rho}/\lambda_L; \lambda_L \approx 0.19 \text{ m for } L_1 \quad \text{(Equation 7)}$$

$$\text{Code\_cmd} = \Delta\hat{\tau}/0.02 \text{ sec} \quad \text{(Equation 8)}$$

$$\text{Carrier\_cmd} = \Delta\hat{\phi}/0.02 \text{ sec} \quad \text{(Equation 9)}$$

The code and carrier NCO commands may be transmitted to the bank of replica generators 408 at a 50 Hz data rate. Other data rates may be used. The code and carrier commands may be used by the NCO command generators 328, 330 to adjust the bank of replica generators 408. The update may enable the GPS sensor 104 to track the GPS satellites under higher interference or jamming levels.

Figure 5:
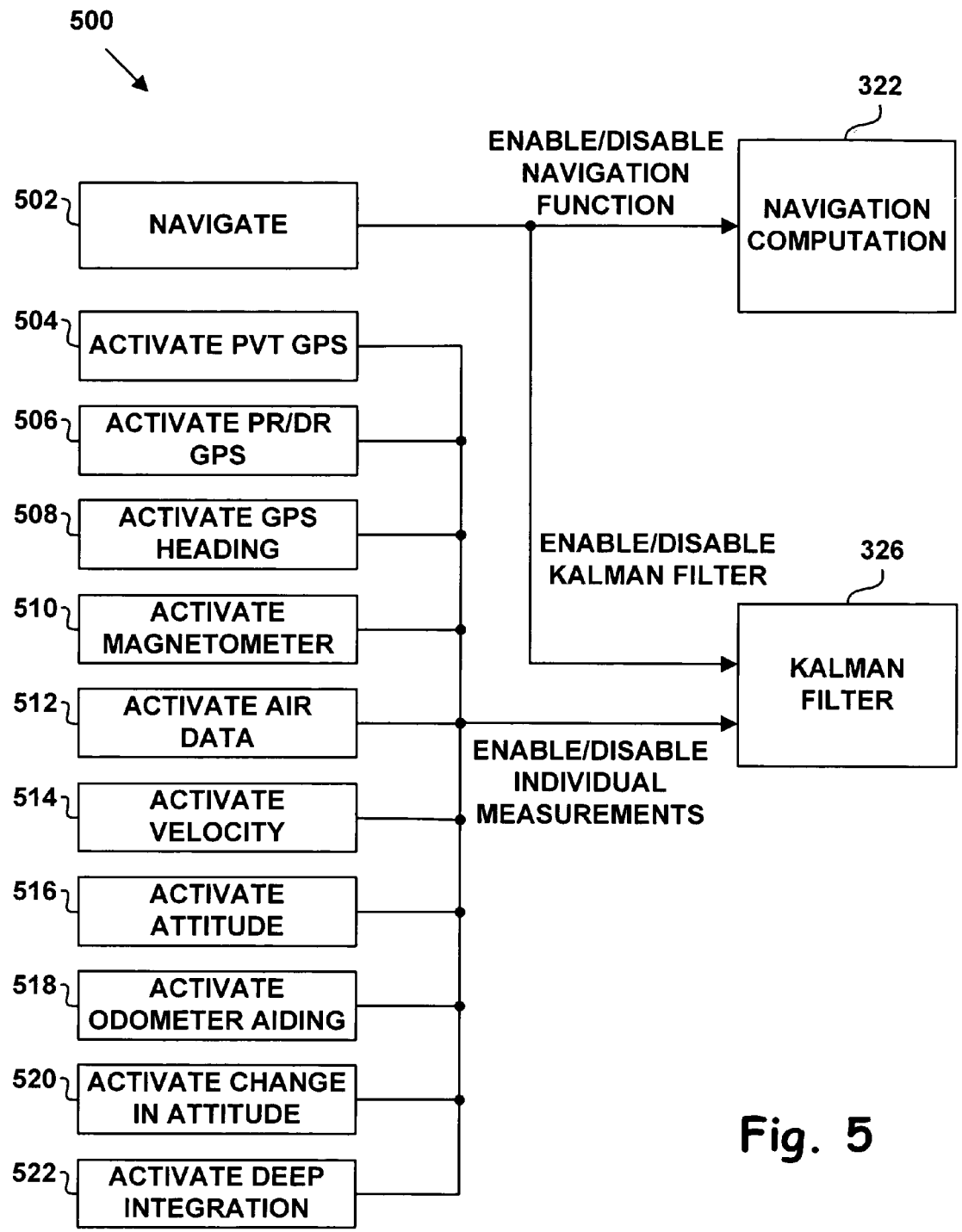
FIG. 5 is a block diagram of mode logic, according to an exemplary embodiment.

FIG. 5 is a block diagram of mode logic 500, according to an exemplary embodiment. The mode logic 500 may be substantially the same as the mode logic 324 depicted in FIG. 3. The mode logic 500 may include a plurality of switches 502-522. The switches 502-522 may be either hardware or software switches, but are preferably software switches. Eleven switches are depicted in FIG. 5; however, more or less than eleven switches may be used in the mode logic 500. The number of switches in the mode logic 500 may be related to the amount of sensor data collected by the navigation system 100 and by the number of operational modes used by the navigation system 100.

The navigate switch 502 may determine the mode of the navigation system (e.g., standby or navigate). The switches 504-518 may determine which data the Kalman filter 326 will use to calculate corrections to the navigation solution. The activate change in attitude switch 520 may be used to determine whether leveling should be engaged as described with reference to FIG. 1.

The navigate switch 502 may be in the "open" or disabled position indicating that the navigation system 100 is in the standby mode. In the standby mode, a navigation solution may not be provided. Both the navigation computation element 322 and the Kalman filter 326 may be disabled. Accordingly, the position of the other switches 504-522 may be irrelevant to the operation of the navigation system 100. If the navigate switch 502 is in the "closed" or enabled position, the navigation computation 322 and the Kalman filter 326 may be enabled.

When the navigate switch 502 is enabled, the position of the other switches 504-522 may be relevant. Each of the switches 504-522 may operate independently from each other. Accordingly, the mode logic 500 may determine which flight data to use (e.g., air data, velocity, attitude) and whether to operate in the deep integration mode or the aiding mode. The mode logic 500 may determine which aiding data to use based on which sensors are providing accurate flight data. More specifically, the mode logic 500 may determine which flight data to use based on the results of the resume logic 600 described with reference to FIG. 6.

When the activate deep integration switch 522 is enabled, the navigation system 100 may operate in the deep integration mode. When the activate deep integration switch 522 is disabled, the navigation system may operate in the aiding mode, which includes two sub-modes: PVT and PR/DR aiding. The activate PVT GPS switch 504 may be enabled for operating in the PVT aiding mode, while the activate PR/DR GPS switch 506 may be enabled for operating in the PR/DR aiding mode.

When the activate GPS heading switch 508 is enabled, GPS heading data may be used by the Kalman filter 326 to calculate corrections to the navigation solution. The GPS heading data may be calculated by conventional means. For example, the GPS heading data may be calculated as described in commonly assigned U.S. Pat. Nos. 5,917,445; 6,088,653; and 6,114,988; which are fully incorporated herein by reference.

When the activate magnetometer switch 510 is enabled, data from the magnetometer 106 may be used by the Kalman filter 326 to calculate corrections to the navigation solution. When the activate air data switch 512 is enabled, data from the air data computer 108 may be used by the Kalman filter 326 to calculate corrections to the navigation solution. When the activate velocity switch 514 and/or the activate attitude switch 516 is enabled, data from other inertial navigation systems on the aircraft may be used by the Kalman filter 326 to calculate corrections to the navigation solution. When the activate odometer aiding switch 518 is enabled, data from an odometer may be used by the Kalman filter 326 to calculate corrections to the navigation solution. The odometer reading may be used by the Kalman filter 326 to calculate position change over time (i.e., velocity).

Figure 6:
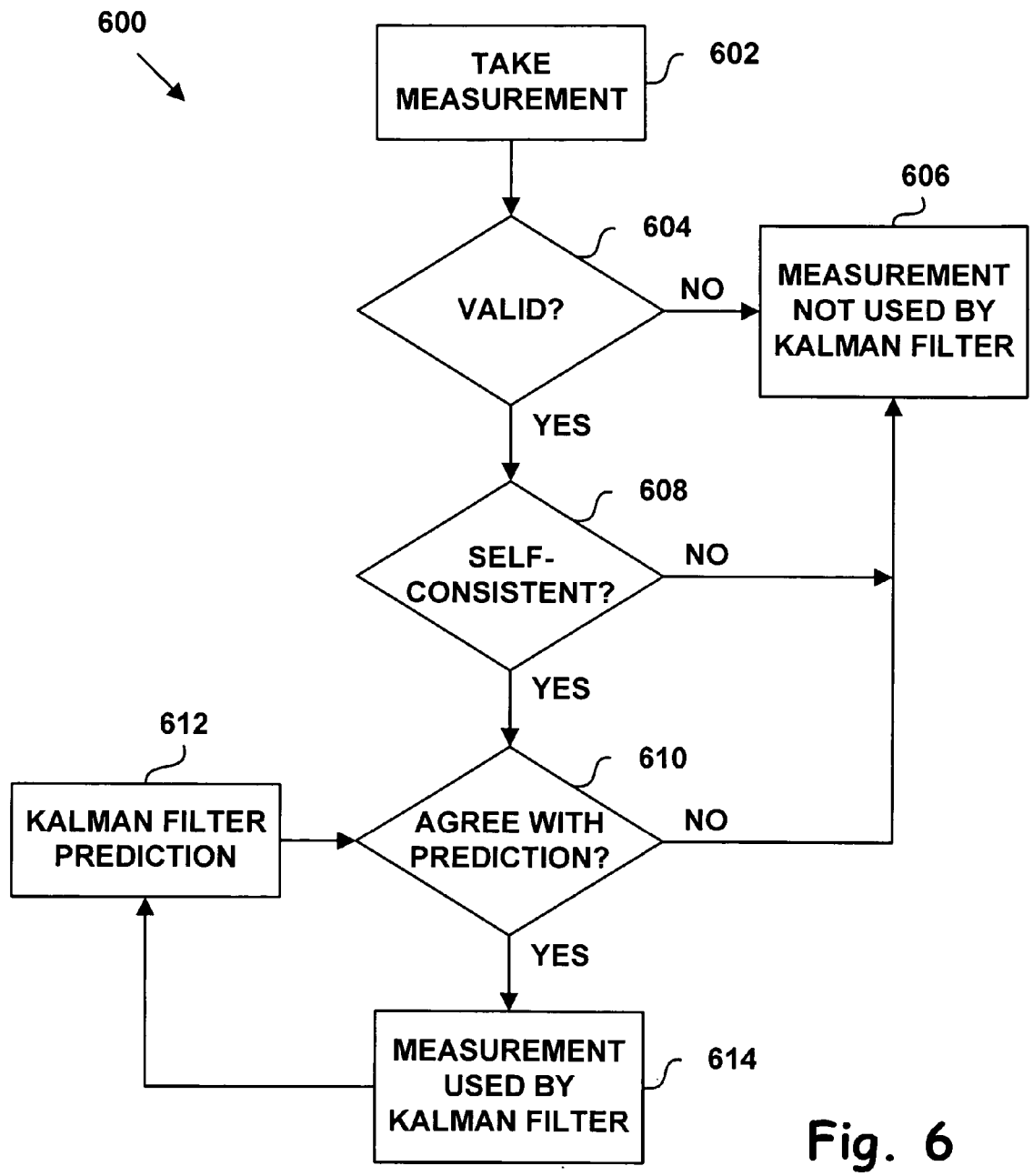
FIG. 6 is a flow chart of resume logic, according to an exemplary embodiment.

FIG. 6 is a flow chart of resume logic 600, according to an exemplary embodiment. The resume logic 600 may be a software program located within the system processor 110. The resume logic 600 may apply to all aiding sources depicted in FIG. 1 (e.g., three accelerometers, three gyroscopes, the GPS sensor, the magnetometer, and the air data computer). The resume logic 600 may be implemented when no errors have been detected in previous data measurements. Alternatively, the resume logic 600 may be implemented after data from one or more sensors has been previously found to be erroneous.

At block 602, a measurement is taken. The measurement may be the PVT or PR/DR data measured by the GPS sensor 104, the magnetic field data measured by the magnetometer 106, the air data measured by the air data computer 108, or any other sensor data measurement.

At block 604, the measurement is checked for validity. The sensor may provide one or more validity bits to the system processor 110. The validity bit may be used to determine if the data from the sensor measurement is new. For example, system processor 110 may determine that the data had been previously transferred to the system processor 110 (e.g., old data), which would be an indication that the data is not valid or has been previously processed. The previously transferred data may or may not have been previously determined to have errors. The validity bits may provide other information indicating whether or not the data is valid as well.

At block 606, if the measurement is not valid based on the validity bit check, then the measurement is not used by the Kalman filter to calculate corrections to the navigation solution.

At block 608, the measurement is checked to determine if the measurement is self-consistent. The system processor 110 may have data regarding the operational capacity of the aircraft. As such, the system processor 110 may know the valid range of data from each of the sensors. For example, the air data computer 108 may provide the system processor 110 with the air speed of the aircraft. If the air speed data is greater than the maximum speed that the aircraft can travel, the system processor 110 may determine that the air speed data is erroneous.

At block 606, if the measurement is not self-consistent, then the measurement is not used to calculate corrections to the navigation solution. Using the example provided above, if the air speed data is erroneous, the air speed data from the air data computer 108 may not be used by the Kalman filter to calculate corrections to the navigation solution.

At block 610, the measurement is compared to a Kalman filter prediction 612. The Kalman filter 326 may be used to predict the position, velocity, and/or attitude of the aircraft. The Kalman filter 626 may be located in the system processor 110 and receive recursive data measurements as shown at block 614. If the data is not within a certain percentage of the Kalman filter prediction 612, the data may contain an error. For example, a deviation of $3\sigma$ from the Kalman filter prediction 612 may indicate that the data is erroneous.

At block 606, if the measurement does not agree with the Kalman filter prediction 612, then the measurement is not used by the Kalman filter to calculate corrections to the navigation solution.

At block 614, the measurement may be used by the Kalman filter 326 to provide corrections to the navigation solution. The measurement may be used whether or not the sensor previously provided erroneous data. For example, if the air data computer previously provided erroneous air speed data and the current air speed data has passed a validity check, a self-consistent check, and a Kalman filter prediction check, the current air speed data may be used to calculate the corrections by way of the Kalman filter 326, which may be provided to the navigation computation element 322 to calculate the navigation solution. This data may be sent to the Kalman filter 326 as depicted at block 612.

The resume logic 600 may allow the navigation system 100 to automatically determine that a sensor that had previously provided erroneous data is currently providing valid data. The results of the resume logic 600 may be used by the mode logic 500 to determine which sensor data should be provided to the Kalman filter 326. Thus, the navigation system 100 may provide the most accurate navigational solution to the pilot at all times. The resume logic 600 in combination with the mode logic 500 may eliminate the previous requirement for the pilot to manually re-start a sensor that has failed or provided erroneous data.

It should be understood that the illustrated embodiments are exemplary only and should not be taken as limiting the scope of the present invention. While the invention has been described with reference to an aircraft, the invention may be applicable to other vehicles or devices, such as space vehicles, missiles, and pipeline inspection gear. The claims should not be read as limited to the described order or elements unless stated to that effect. Therefore, all embodiments that come within the scope and spirit of the following claims and equivalents thereto are claimed as the invention.

I claim:

1. A system processor for a navigation system, comprising in combination:
   a plurality of radio frequency (RF) ranging systems operable to compute a heading;
   a Kalman filter operable to calculate corrections to a navigation solution based on data received from a plurality of sensors, wherein the Kalman filter controls the plurality of RF ranging systems with the plurality of sensors;
   mode logic operable to (i) select an operating mode of the navigation system and (ii) select which data the Kalman filter uses to calculate the corrections to the navigation solution, wherein the selections are based on which of the plurality of sensors is providing accurate data; and
   a navigation computation element operable to calculate the navigation solution based on data provided by an inertial measurement unit and the corrections to the navigation solution provided by the Kalman filter.

2. The system of claim 1, wherein the plurality of RF ranging systems is selected from the group consisting of a global positioning satellite receiver, Time Difference of Arrival, and Galileo.

3. The system of claim 1, wherein the plurality of sensors is selected from the group consisting of an accelerometer, a gyroscope, a magnetometer, and an air data computer.

4. The system of claim 1, wherein the navigation solution is based on the operating mode of the navigation system as selected by the mode logic.

5. The system of claim 4, wherein the operating mode is selected from the group consisting of deeply integrated mode, aiding mode, and standby mode.

6. The system of claim 5, wherein the aiding mode includes the position velocity time (PVT) mode and the pseudorange/deltarange (PR/DR) mode.

7. The system of claim 1, wherein the navigation solution is a three-dimensional position, three-dimensional velocity, and three-dimensional attitude solution.

8. The system of claim 1, wherein the navigation solution is a three-dimensional attitude solution.

9. The system of claim 1, wherein the mode logic uses resume logic to determine which of the plurality of sensors is providing accurate data.

10. The system of claim 9, wherein the resume logic performs a validity check, a self-consistency check, and a Kalman filter prediction check to determine if the data is accurate.

11. The system of claim 1, wherein the mode logic includes a plurality of software switches.

12. The system of claim 11, wherein one of the plurality of software switches selects navigation mode or standby mode.

13. The system of claim 12, wherein the plurality of software switches selects deep integration mode, position velocity time (PVT) aiding mode, or pseudorange/deltarange (PR/DR) aiding mode in the navigation mode.

14. The system of claim 13, wherein the Kalman filter transmits the corrections to the navigation solution to at least one numerically controlled oscillator command generator in the deep integration mode.

15. The system of claim 14, wherein the at least one numerically controlled oscillator command generator adjusts replica code generators allowing the plurality of RF ranging systems to track multiple satellites.

16. A navigation system, comprising in combination:
   a means of computing heading from a plurality of radio frequency (RF) ranging systems;
   a means for monitoring a plurality of sensors;
   a means for controlling the plurality of RF ranging systems with the plurality of sensors;
   a means for determining which of the plurality of sensors is providing accurate data;
   a means for selecting data from sensors providing accurate data;
   a means for selecting an operating mode of the navigation system; and
   a means for calculating corrections to a navigation solution based on the selected data and the selected operating mode.

17. The system of claim 16, wherein the plurality of RF ranging systems is selected from the group consisting of a global positioning satellite receiver, Time Difference of Arrival, and Galileo.

18. The system of claim 16, wherein the plurality of sensors is selected from the group consisting of an accelerometer, a gyroscope, a magnetometer, and an air data computer.

19. The system of claim 16, wherein resume logic determines which of the plurality of sensors is providing accurate data.

20. The system of claim 19, wherein the resume logic performs a validity check, a self-consistency check, and a Kalman filter prediction check to determine if the data is accurate.

21. The system of claim 16, wherein mode logic selects data from sensors that are providing accurate data and selects the operating mode.

22. The system of claim 21, wherein the mode logic includes a plurality of software switches.

23. The system of claim 22, wherein one of the plurality of software switches selects navigation mode or standby mode.

24. The system of claim 23, wherein the plurality of software switches selects deep integration mode, position velocity time (PVT) aiding mode, or pseudorange/deltarange (PR/DR) aiding mode when in the navigation mode.

25. The system of claim 16, wherein a Kalman filter calculates the corrections to the navigation solution.

26. A method of calculating corrections to a navigation solution based on accurate data, comprising in combination:
computing heading from a plurality of radio frequency (RF) ranging systems;
monitoring a plurality of sensors;
controlling the plurality of RF ranging systems with the plurality of sensors;
determining which of the plurality of sensors is providing accurate data;
selecting data from the sensors providing accurate data;
selecting an operating mode of a navigation system; and
calculating the corrections to the navigation solution using the selected data and the selected operating mode.

27. The method of claim 26, wherein determining which of the plurality of sensors is providing accurate data includes:
performing a validity check,
performing a self-consistency check, and
performing a Kalman filter prediction check.

28. The method of claim 27, wherein the validity check determines whether the data has been previously provided to the Kalman filter.

29. The method of claim 27, wherein the self-consistency check determines whether the data is within a valid range of data from the sensor.

30. The method of claim 27, wherein the Kalman filter prediction check determines whether the data is within a percentage of a Kalman filter prediction.

31. The method of claim 26, wherein the plurality of RF ranging systems is selected from the group consisting of a global positioning satellite receiver, Time Difference of Arrival, and Galileo.

32. The method of claim 26, wherein the plurality of sensors is selected from the group consisting of an accelerometer, a gyroscope, a magnetometer, and an air data computer.

33. The method of claim 26, wherein mode logic selects data from the sensors providing accurate data and selects the operating mode.

34. The method of claim 33, wherein the mode logic includes a plurality of software switches.

35. The method of claim 34, wherein one of the plurality of software switches selects navigation mode or standby mode.

36. The method of claim 35, wherein the plurality of software switches selects deep integration mode, position velocity time (PVT) aiding mode, or pseudorange/deltarange (PR/DR) aiding mode when in the navigation mode.

37. The method of claim 26, wherein a Kalman filter calculates the corrections to the navigation solution using state vector elements.

38. The method of claim 37, wherein the state vector elements include vector elements for navigation errors, global positioning satellite oscillator errors, range bias states, and inertial sensor errors.

* * * * *